(12) United States Patent
Takagishi et al.

(10) Patent No.: US 6,168,844 B1
(45) Date of Patent: *Jan. 2, 2001

(54) OPTICAL INFORMATION RECORDING MEDIUM

(75) Inventors: Yoshikazu Takagishi; Takanori Yoshizawa; Emiko Hamada, all of Tokyo (JP)

(73) Assignee: Taiyo Yuden Co., Ltd.(JP)

(*) Notice: Under 35 U.S.C. 154(b), the term of this patent shall be extended for 0 days.

(21) Appl. No.: 09/128,085

(22) Filed: Aug. 3, 1998

(30) Foreign Application Priority Data

Aug. 1, 1997 (JP) .................................................... 9-219773
Jun. 17, 1998 (JP) .................................................. 10-185719

(51) Int. Cl.$^7$ ...................................................... B32B 3/02
(52) U.S. Cl. ...................... 428/64.1; 428/64.2; 428/64.4; 428/64.8; 428/913; 430/270.18; 430/270.2; 430/495.1; 430/945; 369/283; 369/288
(58) Field of Search .................................. 428/64.1, 64.2, 428/64.4, 64.8, 913; 430/270.14, 270.18, 270.2, 495.1, 945; 369/283, 288

(56) References Cited

U.S. PATENT DOCUMENTS 5,161,150 * 11/1992 Namba .............................. 369/275.4
5,316,814 * 5/1994 Sawada et al. ..................... 428/64.1
5,415,914 * 5/1995 Arioka et al. ....................... 428/64.1
5,547,728   8/1996 Cunningham et al. ..

FOREIGN PATENT DOCUMENTS

0353393 * 2/1990 (EP) .
0396040   4/1990 (EP) .
0840307  10/1997 (EP) .
7105065  11/1995 (JP) .

* cited by examiner

Primary Examiner—Elizabeth Evans
(74) Attorney, Agent, or Firm—Ostrolenk, Faber, Gerb & Soffen, LLP

(57) ABSTRACT

By keeping the imaginary number portion k of the complex index of refraction of the film of the light absorbing layer 3, the mean film thickness dav of the light absorbing layer 3, and the absorbency A related thereto within an appropriate range, the present invention provides an optical information recording medium with good recording sensitivity and playback properties, which makes possible high speed recording by increasing the sensitivity to the recording beam and stable recording with sufficient reflectivity, and which can reduce jitter.

In the present invention, $0.13 \leq A \leq 0.21$ where A (Abs) is the absorbency of the light absorbing layer at the wavelength of the recording beam; and $6.0 \leq k \cdot dav \leq 12.0$ where k is the imaginary number portion of the complex index of refraction of the film in the light absorbing layer and dav (nm) is the mean film thickness of the light absorbing layer, at the wavelength of the recording beam.

4 Claims, 3 Drawing Sheets

$R_1 = (-CH_2)_n - CH_3 \quad n = 0 \sim 4$ $R_2 = -CH_3$

Y = $-CH_3$, $-Cl$, $-Br$, ⎯◯ , $-H$ etc.

$X^- = ClO_4^-$, $BF_4^-$, $PF_6^-$, $SbF_6^-$, $CF_3COO^-$,
$Cl^-$, $Br^-$, $I^-$, $F^-$, etc.

OPTICAL INFORMATION RECORDING MEDIUM

BACKGROUND OF THE INVENTION

1. Field of the Invention

The present invention relates to an optical information recording medium, and more particularly to a writeable optical information recording medium comprising at least a light absorbing layer and light reflecting layer on a transparent substrate.

2. Description of the Related Art

Conventional, writeable optical information recording media are based on the structure wherein a light absorbing layer, comprising an organic dye, is established on a transparent substrate which is pre-grooved in a spiral pattern, and a light reflecting layer, comprising a metal film or the like, is further established on the light absorbing layer, as in Japanese Patent Publication No. 07-105065.

Information is recorded as follows. A recording beam, such as a laser beam, is shone on this optical information recording medium from the substrate side thereof. The light absorbing layer absorbs the energy and a pit is recorded by the heating or decomposition of the dye in the light absorbing layer, or the thermal deformation of the substrate.

Such a writeable optical information recording medium is generally known as a "CD-R". A CD-R is essentially a compact disk (CD) for playback purposes or a disk such as a CD-ROM; this can only be written to once and the records cannot be removed. For this reason, these have come to be widely used, especially in the field of information processing.

With the increasing amounts of information to be recorded and the ever more highly complex levels of information processing, the speed of recording on and reading from optical information recording media have both been increasing for the past several years. 6× recording apparatuses and 15× CD-ROM drives for reading disks were common in the CD-R market by the end of 1996.

When recording at high speeds, like at 6×, for example, the line speed is multiplied six times and a high output laser beam is radiated for ⅙ of each period of time corresponding to each pit length nT of the EFM signal. As a result, an optical information recording medium recorded with a signal having pit lengths within the prescribed range of 3 T to 11 T is attained.

Consequently, in order to control the length of each recorded pit T, the recording apparatus must have a precision greater than in conventional recording at an equivalent speed. Also, because pits of each prescribed length must be formed in only a fraction of the time used before now, the impact of heat generated during recording and of heat interference on the recording medium is accordingly greater than before. A consequent problem is that the jitter, which results from the thermal heterogeneity generated during high speed recording, has been made worse.

In other words, it becomes impossible to attain an adequate reflectivity where k and dav are high at the wavelength at which data are to be recorded, when k is the imaginary number portion of the complex index of refraction of the film in the aforementioned light absorbing layer, and dav is the mean film thickness of the light absorbing layer. Oppositely, when k and dav are small, adequate reflectivity can be attained, but the recording sensitivity drops and sufficient recording becomes impossible, even with the recording laser at maximum power.

When the aforementioned k and dav are high, a reflectivity Rtop of 65% or greater cannot be achieved with a disk as the recording medium.

Oppositely, when k and dav are low, the problems are that a laser at sufficiently low power cannot effect recording and the increased jitter makes it difficult to adjust to high speed recording as discussed above.

SUMMARY OF THE INVENTION

In view of the foregoing, it is an object of the present invention to provide an optical information recording medium, which is recordable at high speeds because of increased sensitivity to the recording beam.

It is another object of the present invention to provide an optical information recording medium with increased sensitivity to the recording beam, resulting in good sensitivity and no variations in the recording characteristics, meaning little difference in sensitivity, even when recording with a similar, but different type of laser.

It is another object of the present invention to provide an optical information recording medium, which makes possible sufficient reflectivity and stable recording and. which can reduce jitter.

It is another object of the present invention to provide an optical information recording medium, with good recording sensitivity and playback characteristics because of adjusting the following to within an appropriate range: the imaginary number portion k of the complex index of refraction of the film in the light absorbing layer, the mean film thickness dav of the light absorbing layer, and the absorbency A related thereto.

DESCRIPTION OF THE PREFERRED EMBODIMENTS

Specifically, the present invention gives attention to the adjustment to an appropriate range of k, dav and absorbency A attained therefrom and is an optical information recording medium for recording information by shining a recording beam on a light absorbing layer, comprising a transparent substrate; a light absorbing layer including a light absorbing material, comprising a dye for absorbing the recording beam from a laser, and which is established on this substrate; and a light reflecting layer for reflecting the laser beam and which is established on this light absorbing layer. In this optical information recording medium, $0.13 \leq A \leq 0.21$ where A (Abs) is the absorbency of the light absorbing layer; and $6.0 \leq k.dav \leq 12.0$ at the wavelength of the aforementioned recording beam, where k is the imaginary number portion of the complex index of refraction of the aforementioned light absorbing layer and dav (nm) is the mean film thickness of the light absorbing layer.

A material, such that the imaginary number portion k of the complex index of refraction of the film of the aforementioned light absorbing layer becomes $0.1 \leq k \leq 2.0$ at the wavelength of the aforementioned recording laser, can be added to the aforementioned light absorbing layer.

The mean film thickness dav of the aforementioned light absorbing layer can be $40\ nm \leq dav \leq 85\ nm$.

Figure 2:
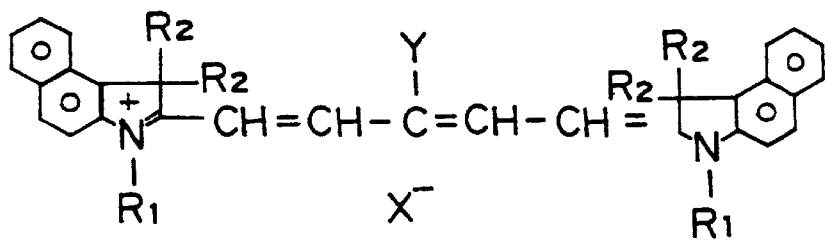
FIG. 2 is a diagram showing the structural formula of the benzoindodicarbocyanine dye, which may be used as the principal light absorbing material in the optical information recording medium 1 relating to the present invention.

The aforementioned light absorbing material can comprise 80 mol % or more of benzoic cyanine dye having the structural formula shown in FIG. 2.

The optical information recording medium relating to the present invention can have good recording sensitivity and playback properties because of being constituted such that $0.13 \leq A \leq 0.21$ where A (Abs) is the absorbency of the light absorbing layer; and $6.0 \leq k.dav \leq 12.0$ at the wavelength of the recording beam, where k is the imaginary number portion of the complex index of refraction of the light absorbing layer and dav is the mean film thickness of the light absorbing layer.

Figure 1:
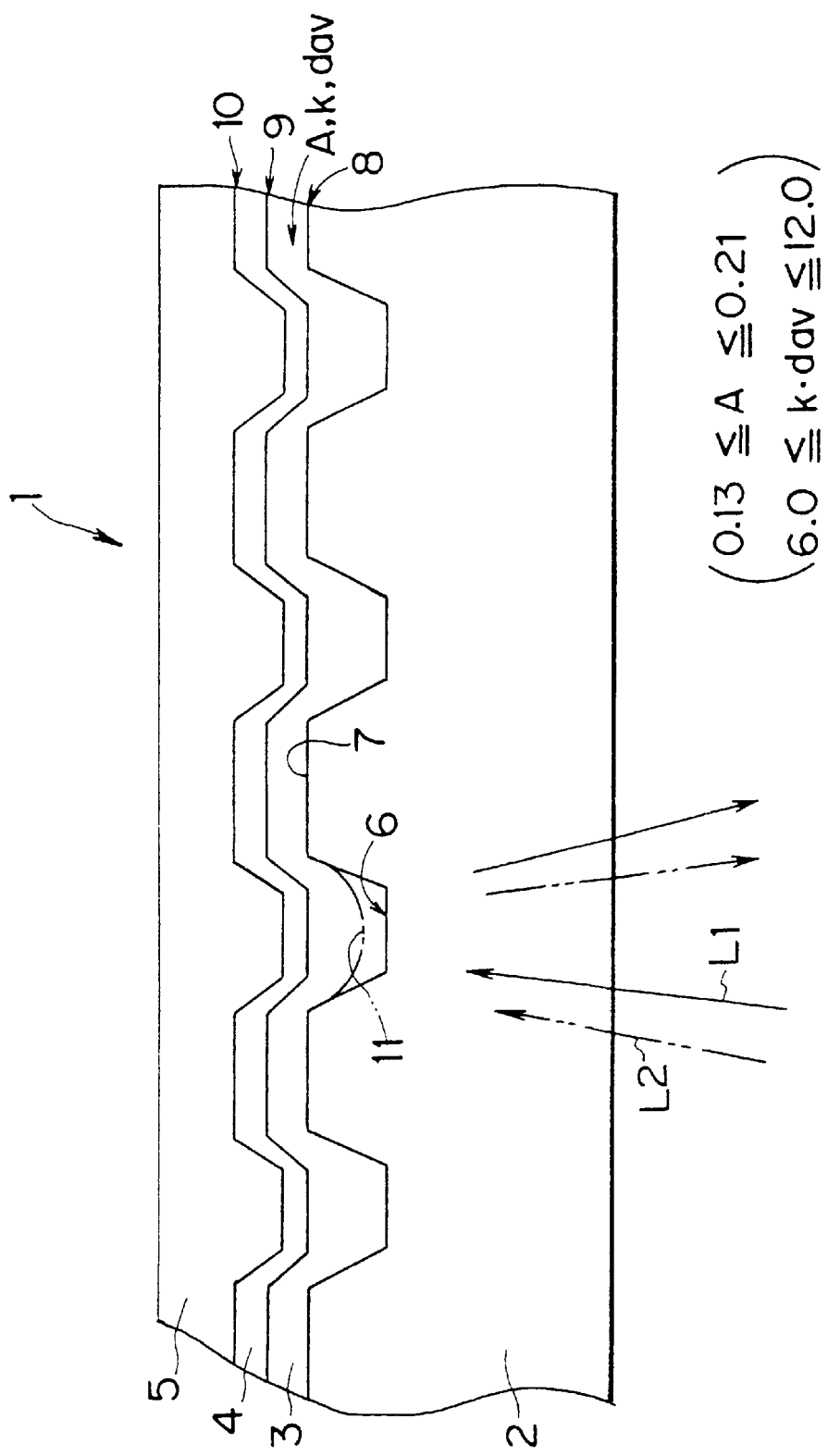
FIG. 1 is a cross sectional view of the optical information recording medium 1 relating to the present invention.

The present invention is explained more specifically below. FIG. 1 is a cross sectional view of the optical information recording medium 1 relating to the present invention. The optical information recording medium 1 comprises a transparent substrate 2, a light absorbing layer 3 formed on the substrate 2, a light reflecting layer 4 formed on the light absorbing layer 3, and a protective layer 5 formed on the light reflecting layer 4.

A spiral-shaped pre-groove 6 is formed on the substrate 2. A portion other than the pre-groove 6, specifically land 7, is located on either side of the pre-groove 6.

The light absorbing layer 3 comprises a principal light absorbing material, comprising one or a plurality of dyes which absorb the laser beam L1, and as necessary, stabilizers for stabilizing this principal light absorbing material or other additives.

The stabilizer (light stabilizer) is a compound wherein the absorption peak of the film is within the near infrared range of wavelength 900–1100 nm, and which has weak absorption of light in the range from short wavelengths, in the range absorbed by the principal light absorbing material, to long wavelengths, the ultraviolet range of 1500 nm or greater. For this reason, the stabilizer is a compound which is very effective in stabilizing the principal light absorbing material, although it cannot be expected to greatly improve recording sensitivity.

This stabilizer may be aminium salt, imonium salt, or a dithiol conjugate such as dithiobenzyl.

This stabilizer must be included in the light absorbing layer 3 so as to make up 0.114 30 wt %, and preferably 1–25 wt %, and more preferably 5–20 wt %.

Moreover, the solvent used when applying the mixture of the principal light absorbing material, long wavelength absorbing agent, and stabilizer may comprise 0.01–1.0 wt % of the light absorbing layer 3.

The solvent for application used here can be an alcohol such as isopropyl alcohol or butanol; an alkoxy alcohol such as methylcellosolve or ethylcellosolve; a ketoalcohol such as diacetone alcohol or acetyl acetone; lactic acid ester such as ethyl lactate or methyl lactate; or alcohol fluoride such as 2,2,3,3 tetrafluoropropanol. The solvent for application is not, however, limited to these.

Moreover, spin coating is generally used in forming the light absorbing layer 3 because of flexibility, but clip coating or vapor deposition methods may be used as necessary.

In view of application properties during coating, resin binders may also be added to the light absorbing layer 3.

The additive resin may be a thermoplastic resin such as nitrocellulose, a resin such as thermoplastic elastomer, liquid rubber, or the like.

Specifically, the resin may be isobutylene, maleic anhydride copolymer, ethylene oxide copolymer, polypropylene chloride, polyethylene oxide, polyamide, nylon, cumarone resin, ketone resin, vinyl acetate, polystyrene, PVA (polyvinyl alcohol), PVE (polyvinylester), or the like.

The cellulose derivative may be carboxymethyl cellulose, nitrocellulose, HPC (hydroxypropyl cellulose), HEC (hydroxyethyl cellulose), MC (methyl cellulose), EC (ethyl cellulose), EHEC (ethylhydroxyethyl cellulose), CMEC (carboxymethylethyl cellulose), or the like.

The oligomer may be oligostyrene, methylstyrene oligomer, or the like.

The elastomer rubber may be styrene block copolymer, urethane-type thermoplastic elastomer, or the like.

Moreover, the substrate 2 and light absorbing layer 3 are in contact via the first interlayer 8. The light absorbing layer 3 and light reflecting layer 4 are in contact via the second interlayer 9. the light reflecting layer 4 and the protective layer 5 are in contact via the third interlayer 10.

As shown in the figures, when the recording beam (recording laser beam) L1 strikes the optical information recording medium 1, the light absorbing layer 3 absorbs the energy of this laser beam L1 and is heated thereby. Thermal deformation occurs on the side toward the substrate 2 and forms a pit 11. The index of refraction of the pit 11 portion is changed by the thermal decomposition of the dye in the light absorbing layer 3 at the recorded portion.

Information is read by shining the playback beam (playback laser beam) L2 on this pit 11 portion and finding the pit contrast from the thermal deformation of the substrate 2 at the pit 11 portion, and from the diffraction of light caused by the optical phase difference, due to the difference in the indexes of refraction of the pit 11 portion and the non-pitted portion (land 7).

Moreover, the principal light absorbing material (principle light absorbing agent) is a material which absorbs the laser beam L1 and breaks down during recording, creates variations in the index of refraction within the light absorbing layer 3, and causes the formation of the pit 11.

The aforementioned light absorbing material can include the benzoic cyanine dye having the structural formula shown in FIG. 2.

The aforementioned benzoic cyanine dye is benzoindodicarbocyanine, for example; the light absorbing layer can include 80 mol % or more of the benzoindodicarbocyanine so that the peak wavelength of absorbency for the film is 710 nm or greater. $0.13 \leq A \leq 0.21$, where A (Abs) is the absorbency of the light absorbing layer 3.

$6.0 \leq k.dav \leq 12.0$ at the wavelength of the recording beam L1, where k is the imaginary number portion of the complex index of refraction of the film of the light absorbing layer 3 and dav is the mean film thickness of the light absorbing layer 3. k.dav is the barometer showing the degree of light absorption in the light absorbing layer 3. Up to now, k=0.05 and dav=100 nm, for example, so k.dav=5.0. With the present invention, however, the mean film thickness dav is smaller and the imaginary number portion k of the complex index of refraction of the film in the light absorbing layer 3 is greater. In other words, it is possible that $40 \leq dav$ (nm) $\leq 85$ and $6.0 \leq k.dav \leq 12.0$.

When the mean film thickness dav is 40 nm or less, it is difficult to attain the percentage modulation of 60% which conforms to CD standards. When dav is 85 nm or greater, the jitter during playback becomes bad because of the accumulation of heat in the dye film, and as a result, it becomes difficult to achieve sufficient stability for playback.

In other words, if the imaginary number portion k of the complex index of refraction of the film is small but the film thickness dav of the light absorbing layer 3 is large, the pit 11 is appropriately heated during recording and a recorded pit 11, which was recorded with stability, can be attained. Oppositely, if the imaginary number portion k of the complex index of refraction of the film is great but the film thickness dav is small, a recorded pit 11, recorded with stability, can be attained because the dye in the pit is sufficiently broken down.

When A is less than 0.13 or k.dav is less than 6.0, the recording sensitivity becomes bad.

When A is greater than 0.21 and k.dav is greater than 12.0, the degree of absorption of the laser beam becomes too high, jitter becomes bad, and it becomes difficult to achieve the reflectivity.

Making reflectivity easy to achieve makes it possible to use relatively inexpensive aluminum (Al) or silver (Ag) as the material for the light reflecting layer 4, instead of gold (Au) which is expensive and has been used up to now.

Figure 3:
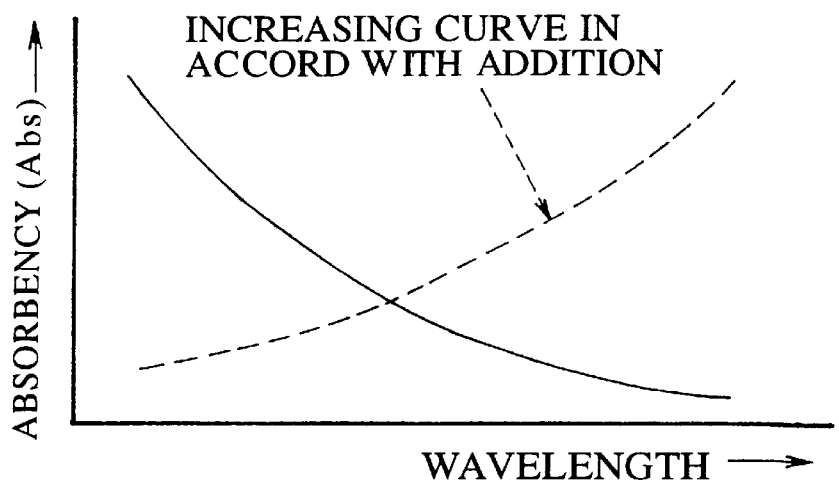
FIG. 3 is a graph of the absorbency A of the light absorbing layer 3 with reference to wavelength, in the optical information recording medium 1 relating to the present invention.

Furthermore, FIG. 3 is a graph of the absorbency A of the light absorbing layer 3 in relation to wavelength. As shown in the figure, absorbency generally decreases as wavelength increases, but it is possible to increase absorbency by adding a long-wavelength absorption material, so that k at the wavelength of the recording beam L1 becomes $0.1 \leq k \leq 2.0$ (dotted line in figure). Absorbency is adjusted by synthesizing the two; k, dav, and A (Abs) can be kept within the range discussed above across all wavelengths of the recording beam L1.

Figure 4:
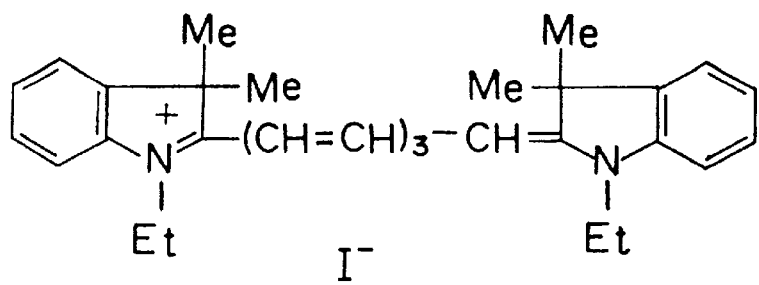
FIG. 4 is a diagram showing the structural formula of the methine C-7 indotricarbocyanine dye, in the optical information recording medium 1 relating to the present invention.
Figure 5:
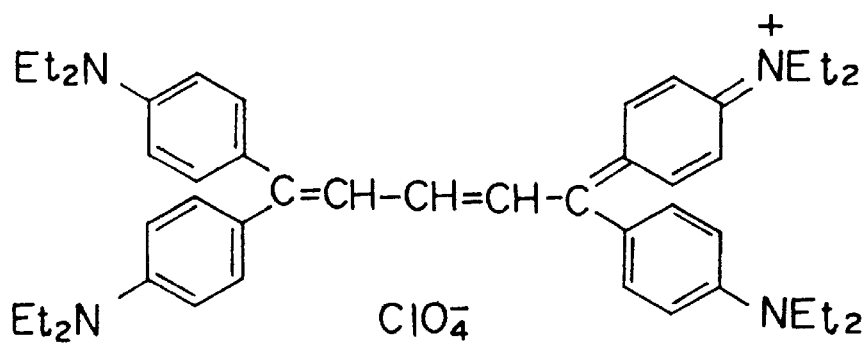
FIG. 5 is a diagram showing the structural formula of the methine C-5 polymethine dye, in the optical information recording medium 1 relating to the present invention.

The following can be used as this additive material: methine C-7 indotricarbocyanine dye as shown in FIG. 4, methine C-5 polymethine dye as shown in FIG. 5, or porphyrin dye such as naphthalocyanine.

First embodiment

Figure 6:
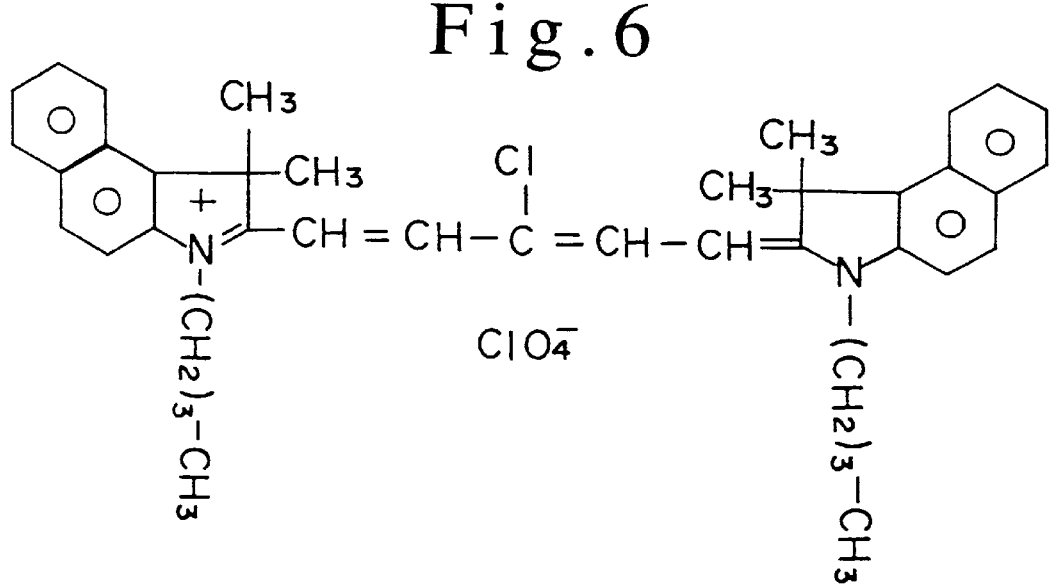
FIG. 6 is a diagram showing the structural formula of the benzoindodicarbocyanine dye (Nihon Kankou Shikiso Kenkyusho (Photosensitive Dye Research Institute of Japan unofficial translation), No. NK-3386), used in Embodiments 1, 2, and 4, in the optical information recording medium 1 relating to the present invention.

An optical information recording medium, which is an embodiment of the present invention, is explained next. Injection molding was used to produce a polycarbonate substrate 2, with thickness 1.2 mm, outer diameter 120 mm, and inner diameter 15 mm, and whereon is formed a spiral-shaped pre-groove 6 with width 0.55 μm, depth 185 nm, pitch 1.6 μm. Next, the benzoindodicarbocyanine dye (No. NK-3386) with the structure shown in FIG. 6, used as the recording dye, was dissolved in diacetone alcohol at 30 grams/liter. This was applied on the aforementioned substrate 2 and a dye film layer (light absorbing layer 3) with a film thickness dav of 69 nm was formed.

At this time, the absorbency A of this film was 0.20 (Abs) at a wavelength of 780 nm.

Also, the optical constant of this film, the imaginary number portion k (of the complex index of refraction of the film), is k=0.1, consequently k.dav=6.9.

A light reflecting layer 4, with thickness 100 nm and comprising gold (Au), was formed by RF sputtering on the substrate 2 having this dye film applied thereon. An ultraviolet-curable resin (Dainippon Ink and Chemicals, Inc., SD-211) was spin coated on this light reflecting layer 4 and exposed to ultraviolet light, forming a 10 μm thick protective layer 5.

The reflectivity at wavelength 780 nm of the optical information recording medium 1 attained in this way was Rg=70.5%R. After recording at a linear velocity of 1.2 m/s with a recording apparatus (Pulse-tech, DDU-1000) using the 780 nm wavelength, it was found that the following could be attained through recording at the low power of 6.2 mW: modulation amplitude I11/Itop=75.4%, I3/Itop= 3:3.2%, Rtop=68.2%R; jitter in the 3 T–11 T region; and both the land 7 and pit 11 had a good eye pattern signal of 30 ns or less. "Itop" is the maximum amount of reflected light in the CD playback signal. "I11" is the optical modulation component corresponding to the difference between the amount of reflected light diffracted by the longest length pit recorded and returned to the objective lens, and the amount of light reflected by the non-pitted portions and returned to the objective lens. "I3" is the optical modulation component corresponding to the difference between the amount of reflected light diffracted by the shortest pit recorded and returned to the objective lens, and the amount of light reflected by the non-pitted portions and returned to the objective lens.

Second embodiment

Using the same type of substrate 2 as was used in the first embodiment, 97 wt % of the benzoindodicarbocyanine dye (No. NK-3386, FIG. 6), having the same structure as in the first embodiment, and 3 wt % of the polymethine dye shown in FIG. 5 were dissolved in diacetone alcohol at 30 grams/ liter. This was applied on the aforementioned substrate 2 and a dye film layer (light absorbing layer 3) with a film thickness dav of 65 nm was formed At this time, the absorbency A of this film at wavelengths of 780 nm and 790 nm was 0.20 (Abs) and 0.18 (Abs) respectively.

Also, the imaginary number portion k of the complex index of refraction of the polymethine dye shown in FIG. 5, at wavelengths of 780 nm and 790 nm, was 0.90 and 0.93 respectively.

The imaginary number portion of the complex index of refraction of the aforementioned dye film layer (light absorbing layer 3), at wavelengths of 780 nm and 790 nm, was k780=0.11 and k790=0.10; consequently, k.dav at wavelengths 780 nm and 790 nm was 7.15 and 6.50 respectively.

As in the first embodiment, a light reflecting layer 4, comprising gold (Au), by RF sputtering, and a protective layer 5 of ultraviolet-curable resin were formed on the substrate 2 having this dye film applied thereon.

The reflectivity at wavelengths 780 nm and 790 nm of the optical information recording medium attained in this manner are respectively Rg 780=71.0%R and Rg 790=70.2%. When 4× recording at linear velocity 4.8 m/s was performed using a recording apparatus (Yamaha, CD-R100) using lasers with wavelengths 780 nm and 790 nm, the modulation amplitude and reflectivity Rtop were I11/Itop=77.2%, I3/Itop=39.0%, Rtop=67.3%R in the case of recording with the 780 nm wavelength laser, and I11/Itop=78.4%, I3/Itop= 34.1%, Rtop=68.2%R in the case of recording with the 790 nm wavelength laser. The jitter in each case was in the 3 T–11 T region and both the land 7 and pit 11 could attain a good eye pattern signal of 33 ns or less.

The recording power at this time was 12.0 mW when using wavelength 780 nm and 12.5 mW when using wavelength 790 nm. Recording could be effected at sufficiently low recording power for a maximum laser output of 16.0 mW.

Third embodiment

A dye (No. NK-3251) wherein R1=—$(CH_2)_3$—, R2=$CH_3$, Y=H, and $X^-=I^-$ in the benzoic cyanine dye with the structure shown in FIG. 2, as the recording dye, was dissolved in diacetone alcohol at 23 grams/liter. This was applied on the substrate 2 attained with the same method as in the first embodiment and a dye film layer (light absorbing layer 3) with a film thickness dav of 46 nm was formed.

At this time, the absorbency A of this film was 0.14 (Abs) at a wavelength of 780 nm.

The optical constant of this film, the imaginary number portion k (of the complex index of refraction of the film), is k=0.13 and consequently k.dav=6.0.

As in the first embodiment, a light reflecting layer 4, comprising gold (Au), by RF sputtering, and a protective layer 5 of ultraviolet-curable resin were formed on the substrate 2 having this dye film applied thereon.

The reflectivity at wavelength 780 nm of the optical information recording medium attained in this manner was Rg=73.5%R. When recorded at linear velocity 1.2 m/s with a recording apparatus (Pulse-tech, DDU-1000) using 780 nm wavelength, the modulation amplitude was I11/Itop=60.8%, I3/Itop=30.1%, Rtop=71.3%R. The jitter was in the 3 T–11 T region and both the land 7 and pit 11 could attain a good eye pattern signal of 30 ns or less with low power recording at 7.4 mW.

Fourth embodiment

The same type of dye as in the first embodiment was used as the recording dye and dissolved in diacetone alcohol at 35 grams/liter. This was applied on the substrate 2 attained with the same method as in the first embodiment and a dye film layer (light absorbing layer 3) with film thickness dav 82 nm was formed.

At this time, the absorbency A of this film was 0.21 (Abs) at a wavelength of 780 nm.

The optical constant of this film, the imaginary number portion k (of the complex index of refraction of the film), is k=0.1 and consequently k.dav=8.2.

As in the first embodiment, a light reflecting layer 4, comprising gold (Au), by RF sputtering, and a protective layer 5 of ultraviolet-curable resin were formed on the substrate 2 having this dye film applied thereon.

The reflectivity at wavelength 780 nm of the optical information recording medium attained in this manner was Rg=68.2%R. When recorded at linear velocity 1.2 m/s with a recording apparatus (Pulse-tech, DDU-1000) using 780 nm wavelength, the modulation amplitude was I11/Itop=83.5%, I3/Itop=36.8%, Rtop=65.2%R. The jitter was in the 3 T–11 T region and both the land 7 and pit 11 could attain a good eye pattern signal of 30 ns or less with low power recording at 6.0 mW.

Fifth embodiment

Injection molding was used to produce a polycarbonate substrate 2, with thickness 0.6 mm, outer diameter 120 mm, and inner diameter 15 mm, and whereon is formed a spiral-shaped pre-groove 6 with width 0.4 $\mu$m, depth 100 nm, pitch 0.8 $\mu$m. Next, 1-n-pentyl-3,3-dimethyl-2-3-(1-n-pentyl-3,3-dimethyl-2-indolinylidene)-1-propenyl-3H-indolinium perchlorate (No. NK-4320), used as the recording dye, was dissolved in diacetone alcohol at 30 grams/liter. This was applied on the aforementioned substrate 2 and a dye film layer (light absorbing layer 3) with a film thickness dav of 71 nm was formed.

At this time, the absorbency A of this film was 0.18 (Abs) at a wavelength of 635 nm.

Also, the optical constant of this film, the imaginary number portion k (of the complex index of refraction of the film), is k=0.10, consequently k.dav=7.1.

A light reflecting layer 4, with thickness 100 nm and comprising aluminum (Al), was formed by RF sputtering on the substrate 2 having this dye film applied thereon. An ultraviolet-curable resin (Dainippon Ink and Chemicals, Inc., SD-211) was spin coated on this light reflecting layer 4. A polycarbonate supporting substrate, with thickness 0.6 mm, outer diameter 120 mm, and inner diameter 15 mm, was applied thereon. This was exposed to ultraviolet light from the side of the supporting substrate and the two substrates were adhered.

When the optical information recording medium 1 attained in this manner was recorded upon at a linear velocity of 3.5 m/s using a recording apparatus with a 635 nm wavelength semiconductor laser, the modulation amplitude was I14/Itop=62.4%, Rtop=60.3%R. A recording with good jitter properties could be attained at a recording power of 11.0 mW.

COMPARISON EXAMPLE

The dye (No. NK-3251) used in the third embodiment was dissolved in diacetone alcohol at 20 grams/liter. This was applied on the substrate attained with the same method as in the first embodiment and a dye film layer (light absorbing layer 3) with film thickness dav of 45 nm was formed.

At this time, the absorbency A of this film was 0.13 (Abs) at a wavelength of 780 nm.

Also, the optical constant of this film, the imaginary number portion k (of the complex index of refraction cf the film), is k=0.13, consequently k.dav=5.9.

As in the first embodiment, a light reflecting layer 4, comprising gold (Au), by RF sputtering, and a protective layer 5 of ultraviolet-curable resin were formed on the substrate 2 having this dye film applied thereon.

The reflectivity at wavelength 780 nm of the optical information recording medium 1 attained in this manner was Rg=74.3%R. When recorded at linear velocity 1.2 m/s with a recording apparatus (Pulse-tech, DDU-1000) using 780 nm wavelength, the modulation amplitude was I11/Itop=58.2%, I3/Itop=29.2%; neither satisfies CD standards.

A high recording power of 8 mW or more was required in this instance.

As discussed above, the present invention limit; the mean film thickness dav, absorbency A, and imaginary number portion k of the complex index of refraction of the film to a prescribed range; the present invention can thereby provide an optical information recording medium with superior properties and which offers stable recording and sufficient reflectivity.

| Explanation of the codes | |
|---|---|
| 1 | Optical information recording medium (FIG. 1) |
| 2 | Transparent substrate |
| 3 | Light absorbing layer |
| 4 | Light reflecting layer |
| 5 | Protective layer |
| 6 | Spiral-shaped pre-groove |
| 7 | Land |
| 8 | First interlayer |

-continued

| | Explanation of the codes |
|---|---|
| 9 | Second interlayer |
| 10 | Third interlayer |
| 11 | Pit |
| L1 | Recording beam (laser beam for recording) |
| L2 | Playback beam (laser beam for playback) |
| k | Imaginary number portion of complex index of refraction of film in light absorbing layer 3 at wavelength of the recording beam L1 |
| dav | Mean film thickness (nm) of light absorbing layer 3 |
| A | Absorbency (Abs) of light absorbing layer 3 |

What is claimed is:

1. An optical information recording medium comprising:
a transparent substrate having a pre-groove formed thereon;
a light absorbing layer established on the substrate and comprising a light absorbing material, constituted from a dye which absorbs the recording laser beam; and
a light reflecting layer established on the light absorbing layer and which reflects the laser beam;
wherein information is recorded through the shining of said recording beam on said light absorbing layer;
$0.13 \leq A \leq 0.21$ where A (Abs) is the absorbency of said light absorbing layer at the wavelength of said recording beam which is incident upon the light absorbing layer through the substrate with the pre-groove; and
$6.0 \leq k.dav \leq 12.0$ where k is the imaginary number portion of the complex index of refraction of the film in said light absorbing layer and dav (nm) is the mean film thickness of the light absorbing layer, at the wavelength of said recording beam.

2. The optical information recording medium, according to claim 1, wherein a material, where the imaginary number portion k of the complex index of refraction of the film of said light absorbing layer becomes $0.1 \leq k \leq 2.0$ at the wavelength of said recording beam, is added to said light absorbing layer.

3. The optical information recording medium, according to claim 1, wherein the mean film thickness dav of said light absorbing layer is $40 \text{ nm} \leq dav \leq 85 \text{ nm}$.

4. The optical information recording medium, according to claim 1, wherein 80 mol % or more of said light absorbing material comprises the benzoic cyanine dye having the structural formula

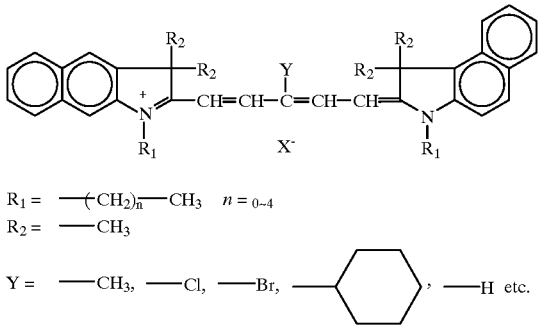

$R_1 = -(CH_2)_n-CH_3 \quad n = 0{\sim}4$ $R_2 = -CH_3$ $Y = -CH_3, -Cl, -Br, -\bigcirc, -H$ etc.

$X^- = ClO_4^-, BF_4^-, PF_6^-, SbF_6^-, CF_3COO^-, Cl^-, Br^-, I^-, F^-,$ etc.

* * * * *